Patented Jan. 12, 1932

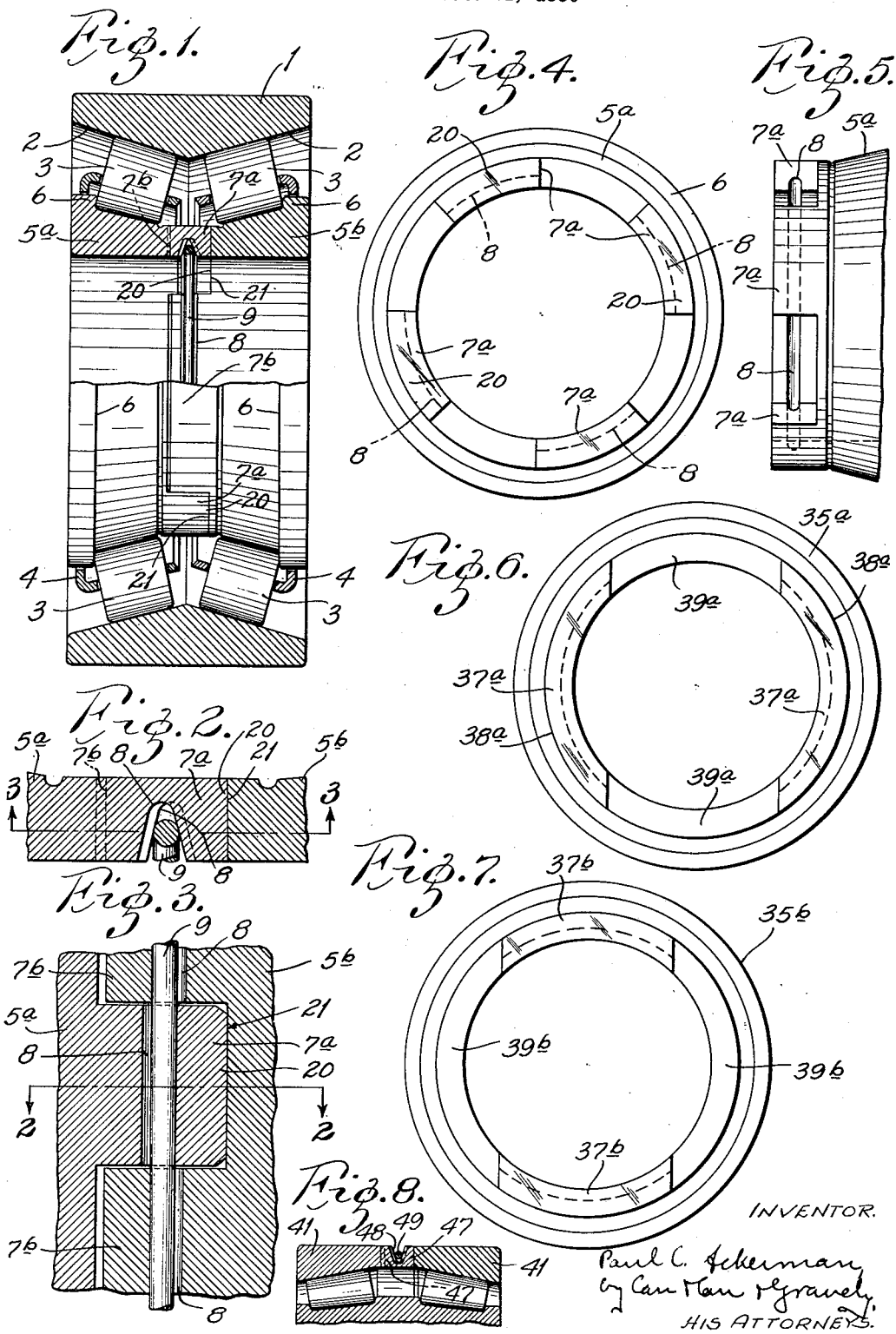

1,840,552

UNITED STATES PATENT OFFICE

PAUL C. ACKERMAN, OF CANTON, OHIO, ASSIGNOR TO THE TIMKEN ROLLER BEARING COMPANY, OF CANTON, OHIO, A CORPORATION OF OHIO

ROLLER BEARING

Application filed October 31, 1930. Serial No. 492,409.

My invention relates to roller bearings, particularly taper roller bearings of the double-row type. It has for its principal object a two-part bearing member construction which facilitates the assembling and disassembling of such bearings and which provides for accurate adjustment of the assembled bearing. The invention consists in a two-part bearing member whose adjacent ends are provided with inter-engaging portions grooved to form a circumferential channel around the middle of the assembled bearing member and a retaining ring mounted in said channel. It also consists in the roller bearing and in the parts and combinations and arrangements of parts hereinafter described and claimed.

In the accompanying drawings,

Fig. 1 is a part longitudinal section of a bearing, part elevation of assembled cones, embodying my invention, Fig. 2 is an enlarged sectional view on the line 2—2 of Fig. 3, Fig. 3 is a diagrammatic circular sectional view taken along the line of the retaining ring securing the two part members together, indicated by the line 3—3 in Fig. 2, Fig. 4 is a small end view of one of the separate inner bearing members, Fig. 5 is an elevation of the small end portion of said inner bearing member, Figs. 6 and 7 are small end views of a pair of slightly modified inner bearing members, and Fig. 8 is a sectional view of a bearing whose outer bearing members embody the invention.

The bearing shown in Fig. 1 comprises a cup or outer bearing member 1 provided with two bore portions 2 tapering toward the middle to constitute conical raceways, two series of conical rollers 3 mounted in suitable cages 4, a cone 5a or inner bearing member for one series of rollers, and a similar cone 5b for the other series of rollers. Each cone 5 has a rib 6 at its large end against which the large ends of the rollers abut.

Said cones 5a and 5b are provided with projecting tongue portions 7a and 7b, the tongues of each cone being adapted to extend into the spaces or grooves between the tongues of the other cone. These projecting tongues 7 are provided with alined grooves 8 extending circumferentially of their inner (under) surface, so that, in the assembled bearing, the grooves of the two cones constitute an annular groove or channel extending around the inner periphery of the assembled cones. Disposed in this channel is a ring 9, preferably split, which holds the two cones together. As is indicated in the drawings, the tongues or projections 7a of one cone are larger than those 7b of the other cone, and the grooves of the assembled cones are slightly offset or staggered, the grooves of the longer tongues 7a being spaced farther away from the ends of the tongues. The ring 9 maintains its circularity and tends to seat in the bottoms of each groove. Thus, the cones are drawn together until the ends 20 of longer tongues 7a are seated against the end walls 21 of the grooves in which they fit. These contacting surfaces are accurately finished to provide proper adjustment of the assembled bearing.

In the modification of Figs. 6 and 7, one cone 35a is provided at its small end with a pair of diametrically opposed projections 37a whose side walls 38a are chordal and with depressions 39a extending circumferentially of the cone between said projections. The second cone 35b has a pair of relatively small projections 37b to fit the depressions of the first cone and a pair of depressions 39b to fit the projections of said first cone. As in the construction above described, one pair of projections is longer than the projections of the other cone.

Fig. 8 illustrates a modification in which the cups or outer bearing members 41 are separate and are provided with inter-engaging tongue portions 47 around whose outer periphery is a channel 48 in which is mounted a retaining ring 49.

The above construction is an important improvement in roller bearings of the double row type. It facilitates assembly and disassembling of the two-part members and machining is comparatively simple, being confined to the ends of the longer projections and the end walls of the grooves in which they fit. The ring holds the cones together in proper adjustment but permits a slight yielding of the separate members, if necessary. The ring may be of light or heavy metal or wire as required by the size of the bearing and the use to which it is to be put.

Obviously numerous changes may be made without departing from the invention and I do not wish to be limited to the precise construction shown.

What I claim is:

1. A conical roller bearing comprising a double outer bearing member, two series of conical rollers, a single inner bearing member for each series of rollers, said single bearing members have interengaging projections and depressions around their meeting faces, said projections have grooves on their inner surfaces, said grooves constituting a circumferential channel around the inner periphery of the assembled cones and a securing ring mounted in said channel.

2. A two-part bearing member for antifriction bearings, said parts having mating projections and depressions, said projections being grooved to form a continuous annular channel around the periphery of the assembled bearing members, the projections of one of said bearing members being longer than the projections of the other bearing member.

3. A two-part bearing member for antifriction bearings, said parts having mating projections and depressions, said projections being grooved on their inner surfaces, said grooves forming a continuous annular channel around the inner periphery of the assembled bearing members, the projections of one of said bearing members being longer than the projections of the other bearing member.

4. An antifriction bearing comprising a double bearing member, two single bearing members, bearing elements therebetween, said single bearing members having inter-engaging portions provided with grooves forming an annular channel around their periphery and a securing ring mounted in said channel adjacent grooves being staggered whereby said ring tends to pull said members together.

5. A roller bearing comprising a double outer bearing member, two single inner bearing members, bearing rollers therebetween, said single bearing members having inter-engaging portions provided with grooves forming an annular channel around their inner periphery and a securing ring mounted in said groove, adjacent grooves being staggered whereby said ring tends to pull said members together.

6. A conical roller bearing comprising a double outer bearing member, two series of conical rollers, a single inner bearing member for each series of rollers, said single bearing members have inter-engaging projections and depressions around their meeting faces, said projections have grooves on their inner surfaces, said grooves constituting a circumferential channel around the inner periphery of the assembled cones and a securing ring mounted in said channel, adjacent grooves being staggered whereby said ring tends to pull said members together.

7. A two-part bearing member for antifriction bearings, said parts having mating projecting and depressed portions, each of said projecting portions being provided with a groove to form a continuous annular channel around the periphery of the assembled bearing members, the grooves of one member being partly offset with respect to the grooves of the other member.

8. A two-part bearing member for antifriction bearings, said parts having inter-engaging tongue portions, said tongues being grooved on their inner surfaces, said grooves forming a continuous annular channel around the inner periphery of the assembled bearing members, the grooves of one member being partly offset with respect to the grooves of the other member.

Signed at Canton, Ohio, this 28 day of Oct. 1930.

PAUL C. ACKERMAN.